United States Patent
Yoon et al.

(10) Patent No.: US 10,985,430 B2
(45) Date of Patent: Apr. 20, 2021

(54) WELDING METHOD CAPABLE OF IMPROVING WELDING RELIABILITY BY PRECISELY SETTING WELDING PORTIONS OF THE ELECTRODE TAPS

(71) Applicant: LG CHEM, LTD., Seoul (KR)

(72) Inventors: Yeo Min Yoon, Daejeon (KR); Jae Woong Kim, Daejeon (KR); Hyoung Kwon Kim, Daejeon (KR); Joo Hwan Sung, Daejeon (KR); Ik Jong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 258 days.

(21) Appl. No.: 16/088,548

(22) PCT Filed: Dec. 22, 2017

(86) PCT No.: PCT/KR2017/015323
§ 371 (c)(1),
(2) Date: Sep. 26, 2018

(87) PCT Pub. No.: WO2018/128310
PCT Pub. Date: Jul. 12, 2018

(65) Prior Publication Data
US 2020/0127268 A1    Apr. 23, 2020

(30) Foreign Application Priority Data

Jan. 3, 2017  (KR) .................. 10-2017-0000493

(51) Int. Cl.
*B23K 26/082*    (2014.01)
*H01M 50/531*    (2021.01)
(Continued)

(52) U.S. Cl.
CPC .......... *H01M 50/531* (2021.01); *B23K 26/03* (2013.01); *B23K 26/082* (2015.10); *B23K 26/22* (2013.01);
(Continued)

(58) Field of Classification Search
CPC ....... H01M 2/26; B23K 26/082; B23K 26/03; B23K 26/22; B23K 37/0435; B23K 2101/38
See application file for complete search history.

(56) References Cited

U.S. PATENT DOCUMENTS 5,289,265 A    2/1994  Inoue et al.
6,552,783 B1   4/2003  Schmidt et al.
(Continued)

FOREIGN PATENT DOCUMENTS

CN    205157453 U    4/2016
JP    2690249 B2    12/1997
(Continued)

OTHER PUBLICATIONS

Machine Translation of Kim et al, KR 10-2014-0132323, performed Aug. 4, 2020 (Year: 2014).*

(Continued)

*Primary Examiner* — Brian W Jennison
(74) *Attorney, Agent, or Firm* — Birch, Stewart, Kolasch & Birch LLP

(57) ABSTRACT

The present disclosure provides a method that includes forming a tab arrangement by vertically arranging the electrode tabs whereby at least parts of the electrode tabs overlap each other; irradiating light to at least two side surfaces among side surfaces of the tab arrangement excluding surfaces on which the electrode tabs overlap and surfaces facing the overlapped surfaces; scanning a planar shape of a step on which the electrode tabs do not overlap each other (Continued)

using light reflected from an end portion of each of the electrode tabs; scanning only an overlapped portion of the electrode tabs excluding the step based on the scanned result; setting a welding range within the overlapped portion; and performing welding only within the welding range.

12 Claims, 7 Drawing Sheets

(51) Int. Cl.
  *B23K 26/03* (2006.01)
  *B23K 26/22* (2006.01)
  *B23K 37/04* (2006.01)
  *B23K 101/38* (2006.01)
(52) U.S. Cl.
  CPC ...... *B23K 37/0435* (2013.01); *B23K 2101/38* (2018.08)

(56) References Cited

U.S. PATENT DOCUMENTS

| | | | |
|---|---|---|---|
| 8,999,546 B2 | 4/2015 | Hostler et al. | |
| 9,136,521 B2 | 9/2015 | Lee et al. | |
| 9,543,561 B2 | 1/2017 | Lee et al. | |
| 9,698,406 B2 | 7/2017 | Kim et al. | |
| 2014/0120397 A1 | 5/2014 | Kim et al. | |

FOREIGN PATENT DOCUMENTS

| | | |
|---|---|---|
| JP | 2003-181666 A | 7/2003 |
| JP | 2004-247244 A | 9/2004 |
| JP | 4093460 B2 | 6/2008 |
| KR | 10-2006-0027252 A | 3/2006 |
| KR | 10-2013-0047506 A | 5/2013 |
| KR | 10-2013-0135129 A | 12/2013 |
| KR | 10-2014-0044444 A | 4/2014 |
| KR | 10-2014-0132323 A | 11/2014 |
| KR | 10-2015-0140035 A | 12/2015 |

OTHER PUBLICATIONS

Machine Translation of Kato, JP 06-129821, performed Aug. 4, 2020 (Year: 1997).*

International Search Report (PCT/ISA/210) issued in PCT/KR2017/015323, dated Apr. 10, 2018.

* cited by examiner

WELDING METHOD CAPABLE OF IMPROVING WELDING RELIABILITY BY PRECISELY SETTING WELDING PORTIONS OF THE ELECTRODE TAPS

TECHNICAL FIELD

The present disclosure relates to a welding method capable of improving welding reliability by precisely setting a welding portion of electrode tabs.

BACKGROUND ART

As the technical development of and the demand for mobile devices have increased, the demand for secondary batteries as an energy source has rapidly increased. Among the secondary batteries, lithium secondary batteries, which have high energy density and discharge voltage, and about which much research has been carried out, are commercially available and widely used.

Generally, a secondary battery has a structure in which an electrode assembly having a structure in which an electrode and a separator are laminated is embedded in a battery case with an electrolyte. Electrodes constituting an electrode assembly need to be connected to the outside, and electrical connection between the electrodes is required as the electrode assembly, and accordingly, connection between electrode tabs which are parts of uncoated portions of the electrodes and connection between the electrode tabs and electrode leads are required.

Welding in which a form of energy such as laser, current ultrasonic wave or the like is applied to overlapped welding base materials such as electrode tabs, or electrode tabs and electrode leads to melt-bond may be used for the connection In particular, laser welding is widely used in automation processes because of the short welding time and the solid bonding.

However, in the laser welding, precise aligning of the laser is required. Accordingly, in order to prevent the laser from being irradiated to a non-overlapped portion of the welding base materials, a vision inspection must precede welding, following which a laser is irradiated on a portion that is set based on the vision inspection.

The vision inspection is an inspection in which light is irradiated on upper and lower surfaces of the welding base materials overlapping each other to confirm a boundary surface of the welding base materials and then the portion to be irradiated with the laser is set. The laser welding may be performed by the laser being automatically irradiated on the portion which is set for irradiation.

FIGS. 1 and 2 show a schematic view of a vision inspection method according to the related art and a photograph of an inspection result.

Referring to the drawings, light is irradiated on the upper and lower surfaces of electrode tabs 1 overlapping each other. Here, a sensor recognizes reflected light, identifies a boundary portion of the overlapped electrode tabs 1, and recognizes a shape of an overlapped portion.

However, since the electrode tabs made of the same material have the same light reflection degree, a boundary formed by a step of the electrode tabs is not clearly distinguished as shown in FIG. 2, and there are problems such as a laser irradiation portion may not be set at a portion in which electrode tabs are overlapped with each other or may be set to be biased to one side so that the laser welding may not be performed in a desired manner.

Also, even though the electrode tabs are made of different materials, there is no difference in the degree of light reflection when colors or surface roughness of the electrode tabs are very similar, and there is a problem in which the boundary formed by the step of the electrode tabs is not clearly distinguished.

Therefore, there is a great need for technology that can fundamentally solve the problems.

DISCLOSURE

Technical Problem

The present disclosure is provided to solve the above-described problems of the related art and technical problems which were identified in the past.

Specifically, an object of the present invention is to provide a welding method capable of precisely setting a laser irradiation portion by irradiating light to side surfaces of electrode tabs in a state in which the electrode tabs are overlapped with each other and clearly distinguishing overlapped boundaries irrespective of a surface state or reflection degree of a metal.

Technical Solution

In order to achieve the above described object, a method of implementing the present disclosure is a method of welding electrode tabs protruding from a plurality of electrode plates and the method includes: forming a tab arrangement by arranging the electrode tabs vertically so that at least parts of the electrode tabs overlap each other; irradiating light to at least two side surfaces among side surfaces of the tab arrangement excluding surfaces on which the electrode tabs overlap and surfaces facing the overlapped surfaces; scanning a planar shape of a step on which the electrode tabs do not overlap each other using light reflected from an end portion of each of the electrode tabs; scanning only an overlapped portion of the electrode tabs excluding the step based on the scanned result; setting a welding range within the overlapped portion; and performing welding only within the welding range.

The scanning of the shape of the step may include:

(i) recognizing a first boundary shape between the electrode tabs on a first side surface while light which is incident on the first side surface is being reflected at the end portion of each of the electrode tabs on the first side surface; and (ii) recognizing n (n being one or more) boundary shapes between the electrode tabs on n side surfaces while light which is incident on the n side surfaces, which are located in directions different from the first side surface, is being reflected at the end portion of the electrode tab located on each of then side surfaces, and based on any one of the boundary shapes, the remaining boundary shapes are combined in a planar manner so that a planar shape formed by the steps is scanned, and the overlapped portion of the electrode tabs may be further scanned.

In the planar shape of the scanned steps, the widest planar portion among the planar shapes which can be formed by the steps may be scanned as the overlapped portion of the electrode tabs.

Generally, when electrode tabs of the same material overlap, light reflected from upper and lower surfaces with a large surface area has the same degree of reflection even though the electrode tabs are different from each other, and light is reflected even at boundaries of the electrode tabs without forming fine intervals between the electrode tabs on the upper and lower surfaces, and thus, in a sensor which recognizes the reflected light, shade formed by the boundaries is hardly formed.

However, in the welding method according to the present disclosure, unlike a conventional visual inspection, light is irradiated to side surfaces of the electrode tabs wherein the fine intervals are formed between the electrode tabs. Accordingly, light is reflected from the boundaries of the end portions of the electrode tabs but not reflected at the fine intervals, and thus, the boundaries of the electrode tabs which are made of the same material may be clearly recognized as shade.

Accordingly, in the present disclosure, the boundaries of the electrode tabs may be clearly distinguished regardless of a degree of reflection even when the electrode tabs are made of the same material, and positions and shapes of the steps may be clearly scanned while the boundaries scanned on each of the side surfaces of the electrode tabs are being combined in a planar manner, and thus only the overlapped portion of the electrode tabs, excluding the steps, may be set as a welding portion.

Further, the above described advantages may also be equally applied to the case in which electrode tabs having the same or similar color overlap and the case in which electrode tabs having almost similar surface roughness overlap.

In one specific example, when n is 2, the first side surface and the second side surface may extend with respect to each other, and the third side surface and the first or second side surface may extend with respect to each other.

The boundary shape is a shape in which straight lines are positioned in parallel in a vertical direction, and while the straight lines are connected to straight lines of the adjacent boundary shape, and the shape of the step may be scanned.

In the process of light irradiation, the light may be irradiated perpendicularly with respect to a vertical section of the electrode tab arrangement so that the boundary shape is not distorted, but in some cases, the light may be irradiated at an angle of 1 to 10 degrees with respect to the vertical section of the electrode tab arrangement so that parts of upper or lower surfaces of the electrode tabs including the boundary shape may also be recognized.

The welding range may be set at 50% to 100% of the total area of the overlapped portion, and a welding start point may be additionally set within the set welding range.

In the present disclosure, the welding may be laser welding, and the tab arrangement may be scanned in a state of being fixed to a laser welding jig configured to fix an arrangement structure of the electrode tabs.

The jig may include a light source configured to irradiate light to the tab arrangement, and accordingly, in the method according to the present disclosure, the tab arrangement may be laser welded together with setting of a laser irradiation site in a state in which the tab arrangement is fixed to the jig.

Effects of the Invention

As described above, in a welding method according to the present disclosure, unlike a conventional visual inspection, light is irradiated to side surfaces of the electrode tabs wherein fine intervals are formed between the electrode tabs. Accordingly, light is reflected from boundaries of the end portions of the electrode tabs but not reflected at the fine intervals, thereby having an advantage of clearly recognizing boundaries of the electrode tabs comprising the same material as shade.

Furthermore, according to the present disclosure, the boundaries of the electrode tabs may be clearly distinguished regardless of a degree of reflection even though the electrode tabs are made of the same material, and positions and shapes of the steps may be clearly distinguished as boundaries scanned on each of the side surfaces of the electrode tabs are combined in a planar manner, thereby only overlapped portion of the electrode tabs, excluding the steps, may be set as a welding portion.

In addition, the above described advantages may also be equally applied to the case in which electrode tabs having the same or similar color are overlapped and the case in which electrode tabs having almost similar surface roughness are overlapped.

DETAILED DESCRIPTION OF THE PREFERRED EMBODIMENTS

Hereinafter, exemplary embodiments of the present disclosure will be described with reference to the accompanying drawings. However, the description provided herein is for better understanding of the present disclosure, and the scope of the present disclosure is not limited thereto.

Figure 1:
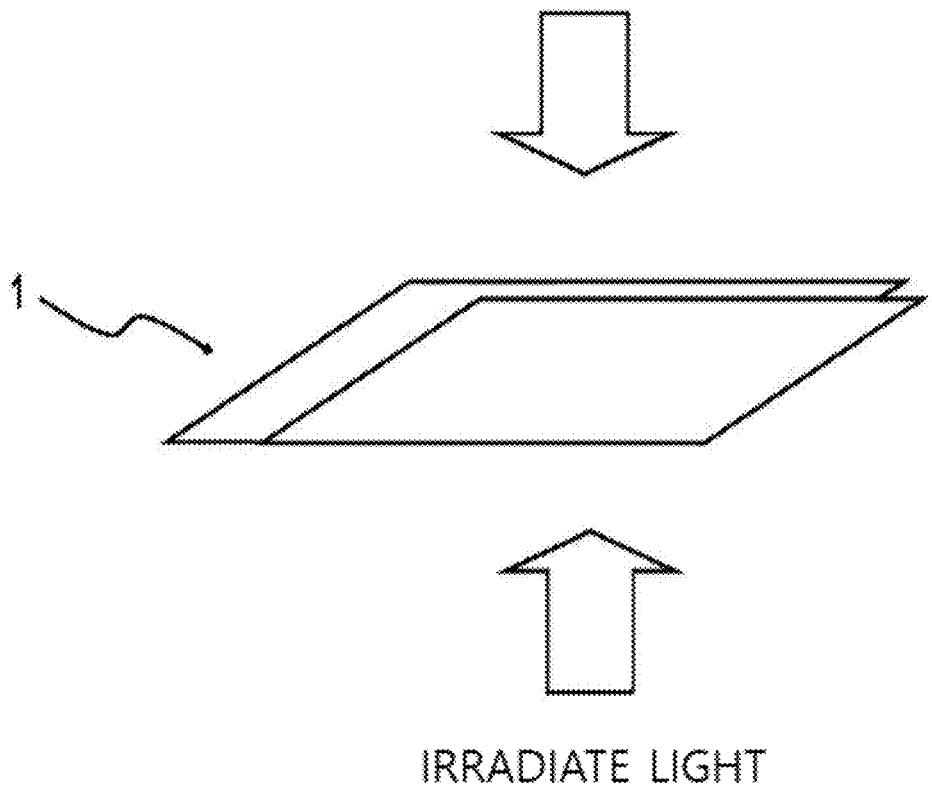
FIGS. 1 and 2 show a schematic view of a vision inspection method according to the related art and a photograph of an inspection result.
Figure 2:
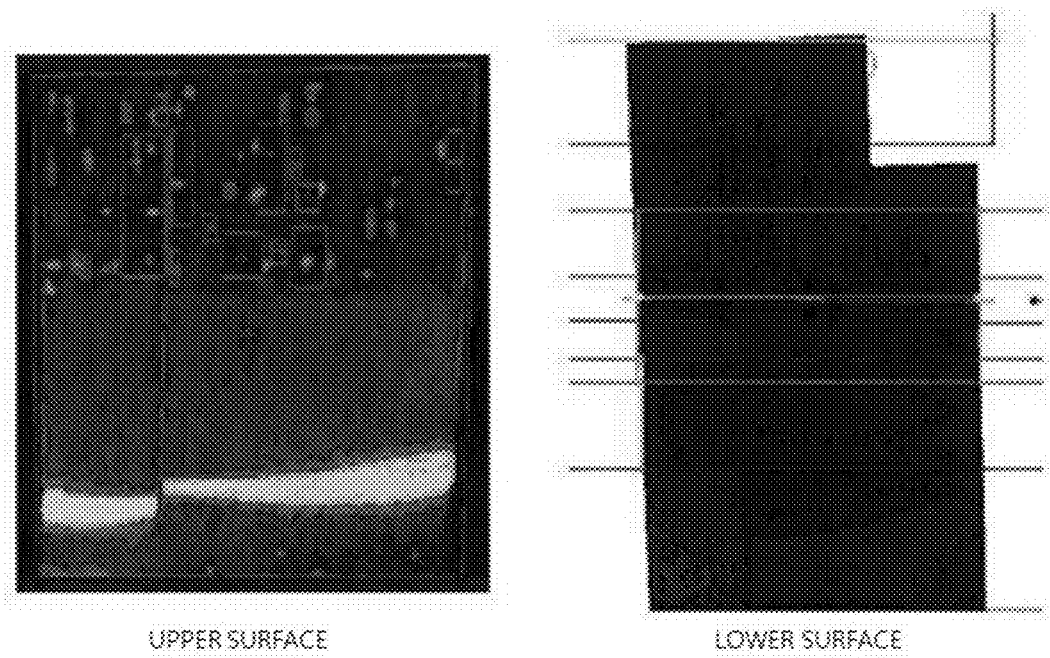
Figure 3:
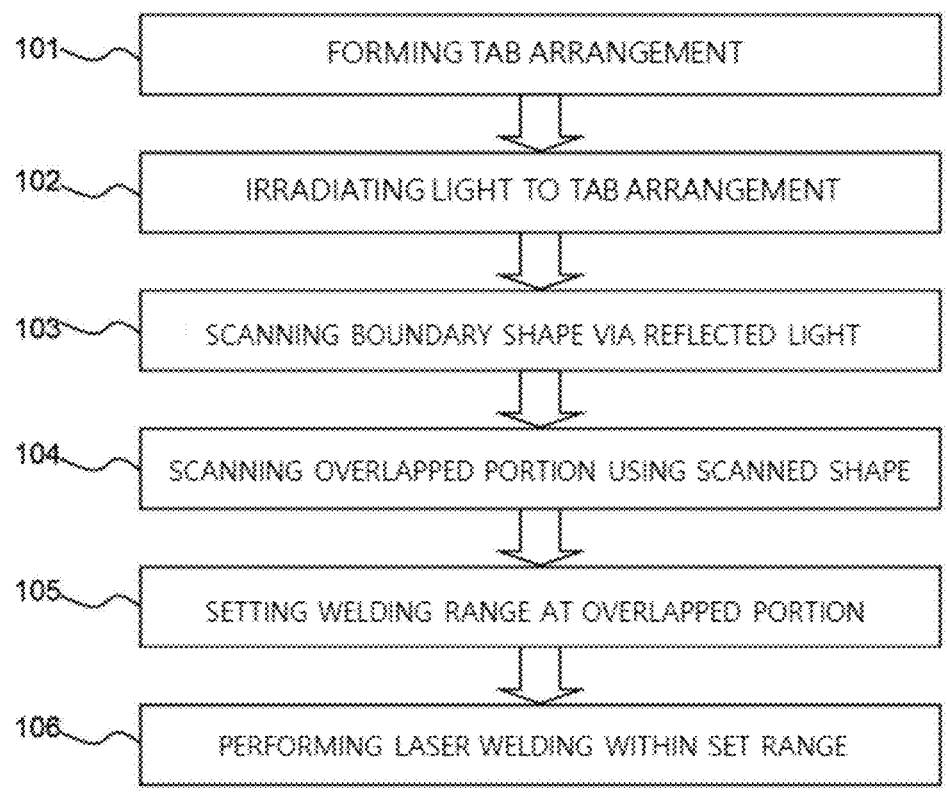
FIG. 3 is a flowchart of a welding method according to one exemplary embodiment of the present disclosure.
Figure 4:
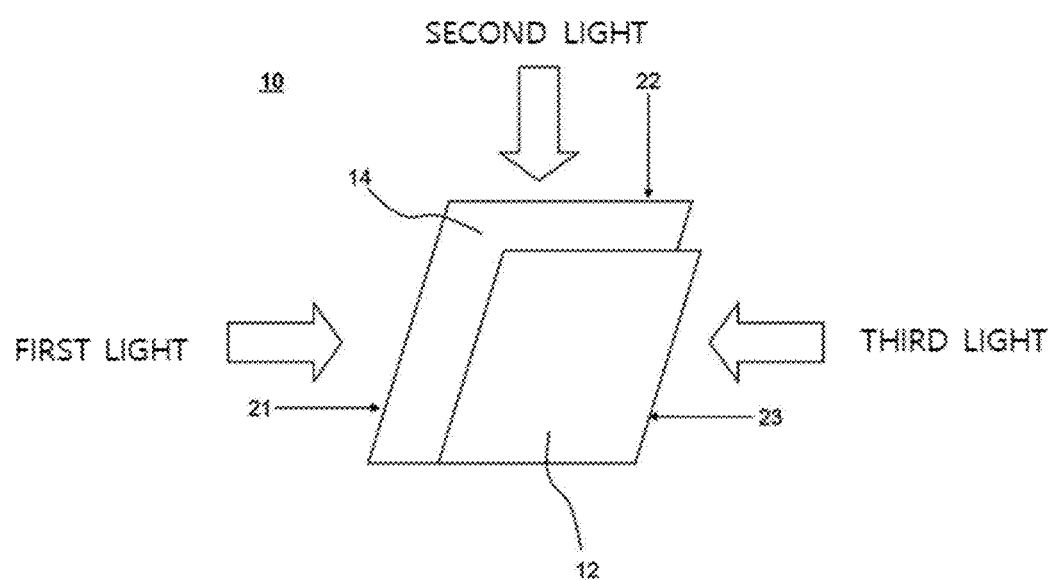
FIGS. 4 to 6 are schematic views morphologically showing a welding method of the present disclosure.
Figure 5:
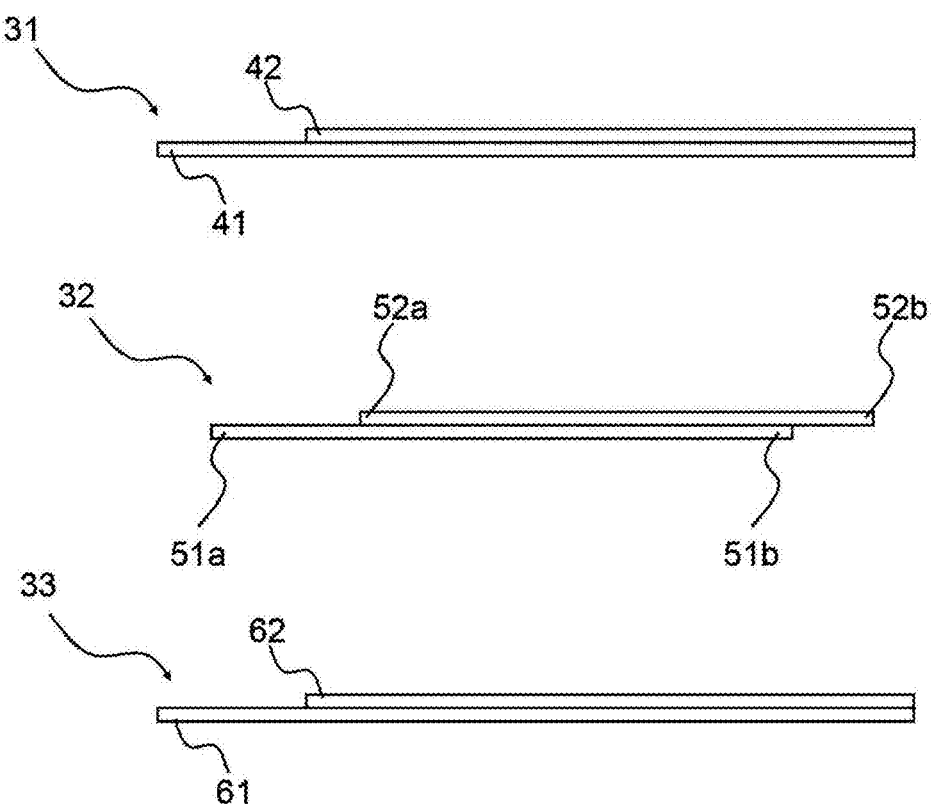
Figure 6:
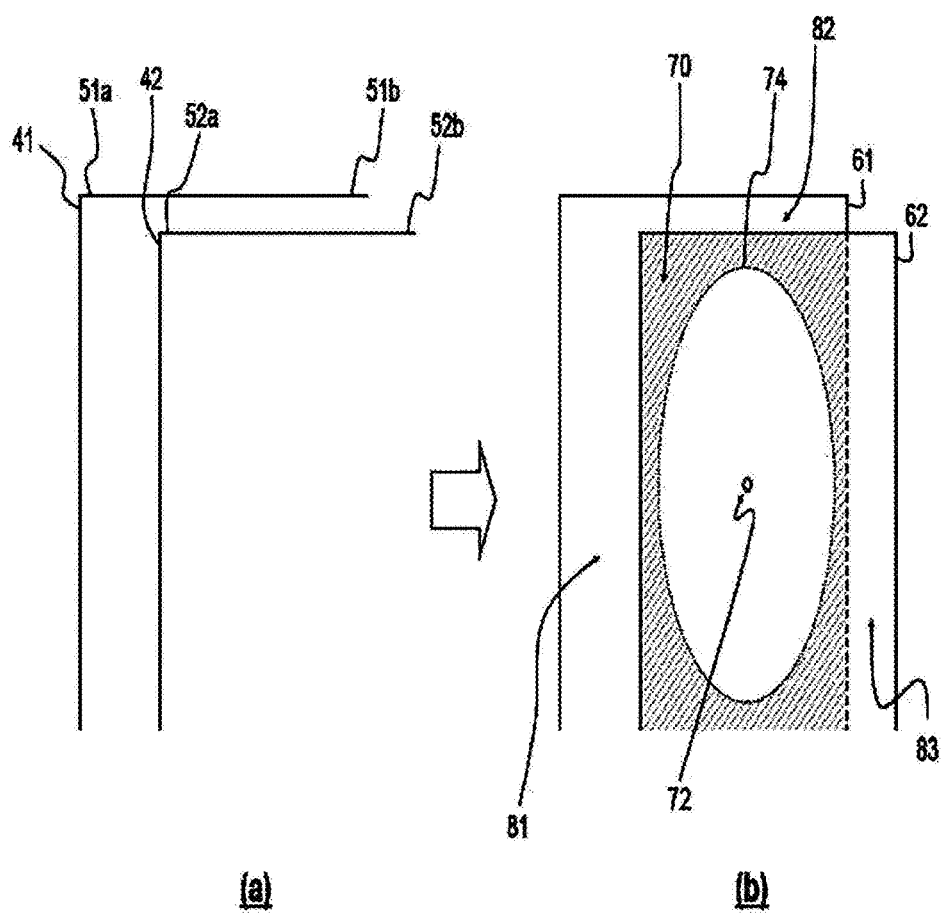

FIG. 3 is a flowchart showing a welding method according to one embodiment of the present disclosure. FIGS. 4 to 6 are schematic views morphologically showing a welding method of the present disclosure.

Referring to these drawings, in the welding method according to the present disclosure, a first electrode tab 12 and a second electrode tab 14 are arranged vertically in a form in which a part thereof overlaps each other to form a tab arrangement 10 in a process 101.

In a process 102, a first light, a second light, and a third light are respectively irradiated to a first side surface 21, a second side surface 22, and a third side surface 23 of the tab arrangement 10, which are formed by extending from the electrode tabs excluding surfaces on which the electrode tabs are overlapped and extending from surfaces facing the overlapped surfaces.

In a process of 103, while the first light incident on the first side surface 21 is being reflected at an end portion of each of the electrode tabs on the first side surface 21, a first boundary shape 31 between the electrode tabs on the first side surface 21 is recognized as shown in FIG. 5.

Further, while the second light incident on the second side surface 22 is being reflected at the end portion of each of the electrode tabs on the second side surface 22, a second boundary shape 32 between the electrode tabs on the second side surface 22 is recognized as is shown in FIG. 5.

Similarly, while the third light incident on the third side surface 23 is being reflected at the end portion of each of the electrode tabs on the third side surface 23, a third boundary shape 33 between the electrode tabs on the third side surface 23 is recognized as shown in FIG. 5.

The recognized boundary shapes 31, 32, and 33 are formed in such a manner that straight lines are positioned in parallel in a vertical direction.

In a process of 104, any one of the boundary shapes may become a reference and is connected to straight lines of the adjacent boundary shape, and a shape of a step may be scanned.

Specifically, while edges 41 and 42 of each straight line of the first boundary shape 31, which are located at a portion on which the first electrode tab 12 and the second electrode tab 14 form a step, are being interconnected with edges 51*a* and 52*a* of each straight line of the second boundary shape 32 adjacent to the first boundary shape 31, a shape of a step is scanned in a planar form as in FIG. 6 (*a*).

Further, while edges 51*b* and 52*b* of each straight line of the second boundary shape 32 adjacent to the third boundary shape 33 are being interconnected with edges 61 and 62 of each straight line of the third boundary shape 33 adjacent to the second boundary shape 32, a shape of a step is scanned in a planar form as in FIG. 6 (*b*).

As described above, in the planar form of the scanned steps, the widest planar portion (70) among plan shapes 81, 82, 83, and 70 which can be formed by the steps is scanned as an overlapped portion 70 of the electrode tabs.

In a process of 105, a welding start point 72 is marked in an approximately center portion of the overlapped portion 70, and a welding range 74 is set at approximately 70% of the total area of the overlapped portion 70 centered on the welding start point 72. Here, a process of 106 is proceeded with to perform laser welding around the welding start point 72.

Figure 7:
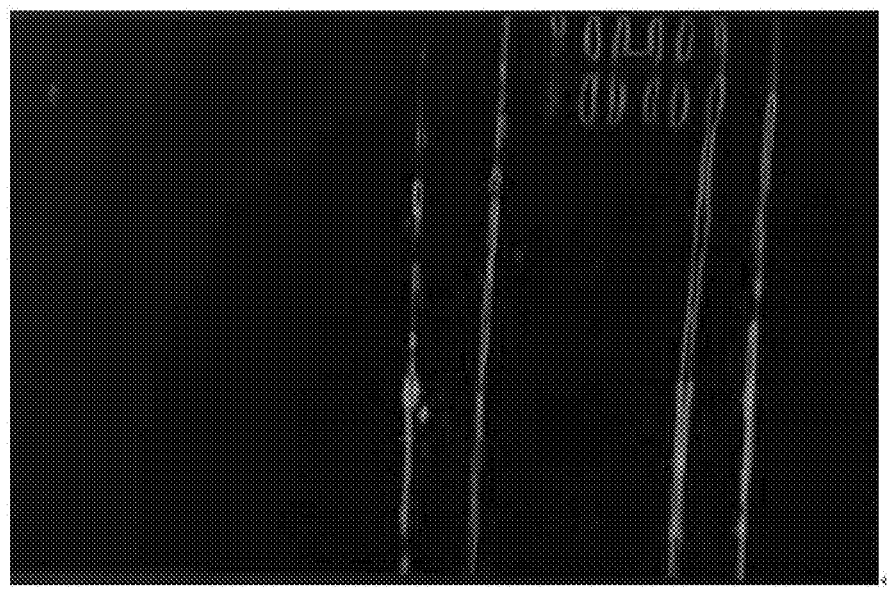
FIG. 7 is an actual photograph of a form of a tab arrangement scanned according to the method of the present disclosure.

FIG. 7 shows an actual photograph of a form of a tab arrangement scanned according to the method of the present disclosure.

Referring to FIG. 7, steps may be clearly distinguished as lines in a method according to the present disclosure, and thus it is possible to easily set an actual welding portion. In particular, boundary shapes which are covered by overlapped electrode tabs may be scanned, and thus it is possible to accurately determine an overlapped shape of the electrode tabs even in a plane.

It should be understood by those skilled in the art that various changes may be made without departing from the spirit and scope of the present disclosure.

The invention claimed is:

1. A method for welding electrode tabs protruding from a plurality of electrode plates, comprising:
   forming a tab arrangement by arranging the electrode tabs vertically so that at least parts of the electrode tabs overlap each other;
   irradiating light to at least two side surfaces among side surfaces of the tab arrangement excluding surfaces on which the electrode tabs overlap and surfaces facing the overlapped surfaces;
   scanning a planar shape of a step on which the electrode tabs do not overlap each other using light reflected from an end portion of each of the electrode tabs;
   scanning only an overlapped portion of the electrode tabs excluding the step based on the scanned result;
   setting a welding range within the overlapped portion; and
   performing welding only within the welding range.

2. The method of claim 1, wherein scanning the planar shape of the step comprises:
   (i) recognizing a first boundary shape between the electrode tabs on a first side surface while light which is incident on the first side surface is being reflected at the end portion of each of the electrode tabs on the first side surface; and
   (ii) recognizing n (n being one or more) boundary shapes between the electrode tabs on n side surfaces while light which is incident on the n side surfaces, which are located in directions different from the first side surface, is being reflected at the end portion of the electrode tab located on each of the n side surfaces,
   and based on any one of the boundary shapes, the remaining boundary shapes are combined in a planar manner so that a planar shape formed by the steps is scanned, and the overlapped portion of the electrode tabs are further scanned.

3. The method of claim 2, wherein in the planar shape of the scanned steps, the widest planar portion among the planar shapes which is formed by the steps, are scanned as the overlapped portion of the electrode tabs.

4. The method of claim 2, wherein when the value of n is 2, the first side surface and the second side surface extend with respect to each other, and the third side surface and the first or second side surface extend with respect to each other.

5. The method of claim 2, wherein the boundary shape is a shape in which straight lines are positioned in parallel in a vertical direction, and while the straight lines are connected to straight lines of the adjacent boundary shape, the shape of the step is scanned.

6. The method of claim 1, wherein the light is irradiated perpendicularly with respect to a vertical section of the electrode tab arrangement in the process of light irradiation.

7. The method of claim 1, wherein the light is irradiated at an angle of 1 to 10 degrees with respect to the vertical section of the electrode tab arrangement in the process of light irradiation.

8. The method of claim 1, wherein the welding range is set at 50% to 100% of the total area of the overlapped portion.

9. The method of claim 8, wherein a welding start point is additionally set within the set welding range.

10. The method of claim 1, wherein the type of welding is laser welding.

11. The method of claim 1, wherein the tab arrangement is scanned in a state of being fixed to a laser welding jig configured to fix an arrangement structure of the electrode tabs.

12. The method of claim 11, wherein the jig comprises a light source configured to irradiate light to the tab arrangement.

* * * * *